United States Patent
Choi et al.

(10) Patent No.: US 9,538,087 B2
(45) Date of Patent: Jan. 3, 2017

(54) IMAGE PROCESSING DEVICE WITH MULTIPLE IMAGE SIGNAL PROCESSORS AND IMAGE PROCESSING METHOD

(71) Applicant: SAMSNG ELECTRONICS CO., LTD., Suwon-Si, Gyeonggi-Do (KR)

(72) Inventors: Jong-Seong Choi, Hwaseong-Si (KR); Ju-Hyun Cho, Suwon-Si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 0 days.

(21) Appl. No.: 14/620,073

(22) Filed: Feb. 11, 2015

(65) Prior Publication Data
US 2015/0237280 A1    Aug. 20, 2015

(30) Foreign Application Priority Data
Feb. 19, 2014    (KR) .................. 10-2014-0019220

(51) Int. Cl.
*H04N 5/374*    (2011.01)
*H04N 5/232*    (2006.01)
*H04N 5/247*    (2006.01)

(52) U.S. Cl.
CPC ...... *H04N 5/23293* (2013.01); *H04N 5/23229* (2013.01); *H04N 5/23235* (2013.01); *H04N 5/23245* (2013.01); *H04N 5/247* (2013.01); *H04N 5/374* (2013.01)

(58) Field of Classification Search
CPC  H04N 5/374; H04N 5/23216; H04N 5/23293; H04N 5/23229; H04N 5/23245; H04N 5/247
See application file for complete search history.

(56) References Cited

U.S. PATENT DOCUMENTS

| | | | |
|---|---|---|---|
| 7,589,748 B2 | 9/2009 | Ahn | |
| 8,493,482 B2 | 7/2013 | Cote et al. | |
| 2003/0020814 A1* | 1/2003 | Ono | H04N 5/225 348/220.1 |
| 2005/0140786 A1* | 6/2005 | Kaplinsky | H04N 5/23203 348/207.1 |
| 2008/0050046 A1* | 2/2008 | Kim | H04N 5/45 382/303 |
| 2008/0316331 A1* | 12/2008 | Jun | H04N 1/0044 348/222.1 |
| 2010/0226590 A1* | 9/2010 | Yoo | G06T 5/002 382/275 |
| 2011/0001838 A1* | 1/2011 | Lee | H04N 5/225 348/220.1 |
| 2011/0090242 A1* | 4/2011 | Cote | G06T 3/4015 345/597 |

(Continued)

FOREIGN PATENT DOCUMENTS

| JP | 2003-087640 | 3/2003 |
|---|---|---|
| JP | 2013-0528021 | 7/2003 |

(Continued)

*Primary Examiner* — Abdelaaziz Tissire
(74) *Attorney, Agent, or Firm* — Volentine & Whitt, PLLC

(57) ABSTRACT

An image processing device includes first and second image signal processors (ISPs) independently capable of processing an image received from an image sensor. The first ISP processes a first image having a first resolution and the second ISP processes a second image having a different second resolution.

19 Claims, 14 Drawing Sheets

(56) References Cited

U.S. PATENT DOCUMENTS

| | | | |
|---|---|---|---|
| 2011/0285867 A1* | 11/2011 | Cha | H04N 5/00 348/222.1 |
| 2012/0081385 A1* | 4/2012 | Cote | H04N 5/23219 345/589 |
| 2012/0120256 A1* | 5/2012 | Hwang | G06T 1/20 348/207.1 |
| 2012/0172086 A1* | 7/2012 | Choi | H04N 1/0044 455/556.1 |
| 2013/0021504 A1* | 1/2013 | Plowman | H04N 19/56 348/241 |
| 2013/0135499 A1 | 5/2013 | Song | |
| 2013/0258136 A1* | 10/2013 | Lee | H04N 5/772 348/231.99 |

FOREIGN PATENT DOCUMENTS

| | | |
|---|---|---|
| KR | 1020110041956 A | 4/2011 |
| KR | 101087550 | 11/2011 |
| WO | WO2011127076 A1 | 10/2011 |
| WO | WO2011127077 A1 | 10/2011 |
| WO | WO2011127078 A1 | 10/2011 |
| WO | WO2011127080 A1 | 10/2011 |

* cited by examiner

IMAGE PROCESSING DEVICE WITH MULTIPLE IMAGE SIGNAL PROCESSORS AND IMAGE PROCESSING METHOD

CROSS-REFERENCE TO RELATED APPLICATION

This application claims the benefit of Korean Patent Application No. 10-2014-0019220 filed on Feb. 19, 2014, the subject matter of which is hereby incorporated by reference.

BACKGROUND

The inventive concept relates generally to image processing devices and methods for processing image signal(s). More particularly, the inventive concept relates to image processing devices capable of processing multiple image streams having different respective resolutions, as well as image processing methods used in such image processing devices.

The term "image sensor" is used to denote a class of electronic devices that capture a visual image and convert the captured image into a corresponding electrical signal. Image sensors are used not only in general consumer electronics, such as digital cameras, mobile phone cameras, and portable camcorders, but also in vehicles, security devices, robots, etc. The CMOS (complementary metal-oxide semiconductor) image sensor is one type of image sensor commonly used in contemporary products. The CMOS image sensor includes a pixel array, wherein each pixel includes a light sensing device. Each light sensing device is configured to generate an analog electrical signal corresponding to the intensity of light received (or absorbed) by the light sensing device. Hereafter, the light received by a light sensing device will be termed "incident light".

An image signal processor (ISP) processes the analog electrical signal(s) provided by one or more light sensing devices of an image sensor by converting the analog electrical signal(s) into corresponding digital data. An ISP may be configured for this purpose and disposed within a variety of devices, such as mobile devices (e.g., smart phones, tablets, etc.).

In certain operative configurations, an ISP may be required to simultaneously process dual image streams, where one image stream has a relatively lower resolution than the other. For example, a mobile device may include two (or more) camera modules, each having a different respective resolution. Thus, a single ISP incorporated in the mobile device may be required to rapidly process both a low-resolution image stream and a high-resolution image stream. However, address the potential requirement of simultaneously processing the low-resolution image stream and high-resolution image stream, the constituent ISP must operate with a sufficiently high processing speed and processing capacity to acceptably process the high-resolution image stream. As a result of this necessity, the ISP must provide a line buffer and/or a kernel size sufficiently large to accommodate the high-resolution image processing requirement. Power consumption by the ISP may also be adversely influenced by the high-resolution image processing requirement.

SUMMARY

According to an aspect of the inventive concept, there is provided an image processing device including a first image signal processor (ISP) configured to process a first image having first resolution; a second ISP configured to process a second image having second resolution; and a post processor configured to receive an image from at least one of the first and second ISPs, and perform a post processing operation on the image.

The second resolution may be higher than the first resolution.

While the first image that was processed by the first ISP is output as a preview image, the second ISP may selectively operate in response to a capture command.

The image processing device may further include a stream controller configured to receive an image stream from an image sensor, and to output the image stream to any one of the first and second ISPs in response to a control signal.

The second image having the second resolution may be provided from an image sensor to the second ISP, and the image processing device may further include a scaler configured to convert the second image having the second resolution provided from the image sensor and thus to provide the first image having the first resolution to the first ISP.

The image processing device may further include a storage unit configured to store at least one second image having the second resolution received from an image sensor, and to provide the at least one second image to the second ISP, in response to a capture command.

The first ISP may receive the first image having the first resolution from a first image sensor, and the second ISP may receive the second image having the second resolution from a second image sensor.

An image from an image sensor may be stored in a memory via a system bus, and the second ISP may receive the second image having the second resolution from the memory via the system bus, in response to a capture command.

The image processing device may further include a first stream controller configured to receive the first image from a first image sensor; and a second stream controller configured to receive the second image from a second image sensor, wherein, while the second ISP receives the first image having the first resolution from the first stream controller and thus processes the first image having the first resolution, the first ISP receives the second image having the second resolution from the second stream controller and thus processes the second image having the second resolution.

According to another aspect of the inventive concept, there is provided a method of processing an image, the method including operations of processing a first image having first resolution, by using a first image signal processor (ISP); determining whether a capture command is received; according to a result of the determining, processing a second image having second resolution that is higher than the first resolution, by using a second ISP; and storing the second image that was processed by the second ISP.

According to another aspect of the inventive concept, an application processor adapted for use in a mobile device and operating as a main processor for the mobile device is provided. The application processor includes a Central Processing Unit (CPU) configured to control operation of the application processor, and a multimedia unit comprising a first image signal processor (ISP) having a first line buffer and operating in accordance with a first kernel size, and a second ISP having a second line buffer larger in size that the first line buffer and operating in accordance with a second kernel size larger than the first kernel size, wherein the first is configured to process a first image having a first resolution, and the second ISP is configured to process a second image having a second resolution higher than the first resolution.

BRIEF DESCRIPTION OF THE DRAWINGS

Certain embodiments of the inventive concept will be more clearly understood from the following detailed description taken in conjunction with the accompanying drawings in which.

DETAILED DESCRIPTION OF EMBODIMENTS

Figure 1:
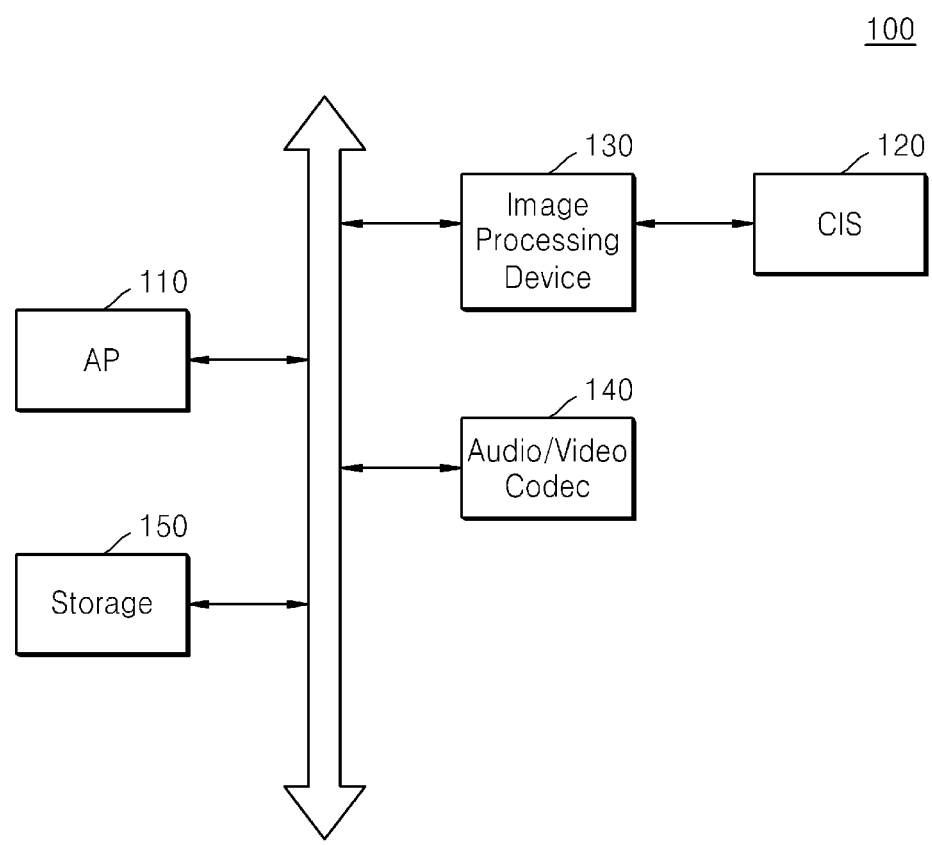
FIG. 1 is a block diagram of a device including an image processing device according to an embodiment of the inventive concept.

Embodiments of the inventive concept will now be described in some additional detail with reference to the accompanying drawings. The inventive concept may, however, be embodied in many different forms and should not be construed as being limited to only the illustrated embodiments. Thus, the inventive concept may include all revisions, equivalents, or substitutions which are included in the concept and the technical scope related to the present inventive concept. Like reference numerals in the drawings denote like elements. In the drawings, the dimension of structures may be exaggerated for clarity.

Furthermore, all examples and conditional language recited herein are to be construed as being without limitation to such specifically recited examples and conditions. Throughout the specification, a singular form may include plural forms, unless there is a particular description contrary thereto. Also, terms such as "comprise" or "comprising" are used to specify existence of a recited form, a number, a process, an operation, a component, and/or groups thereof, not excluding the existence of one or more other recited forms, one or more other numbers, one or more other processes, one or more other operations, one or more other components and/or groups thereof.

Unless expressly described otherwise, all terms including descriptive or technical terms which are used herein should be construed as having meanings that are obvious to one of ordinary skill in the art.

Also, terms that are defined in a general dictionary and that are used in the following description should be construed as having meanings that are equivalent to meanings used in the related description, and unless expressly described otherwise herein, the terms should not be construed as being ideal or excessively formal.

As used herein, the term "and/or" includes any and all combinations of one or more of the associated listed items. Expressions such as "at least one of", when preceding a list of elements, modify the entire list of elements and do not modify the individual elements of the list.

Figure (FIG. 1 is a block diagram of a device including an image processing device 130 according to an embodiment of the inventive concept. The device of FIG. 1 may correspond to various systems including an image sensor, and for example, the device of FIG. 1 may correspond to various mobile devices such as a digital camera, a portable camcorder, a smart phone, etc. Hereinafter, it is assumed that the device illustrated in FIG. 1 is a mobile device 100.

As illustrated in FIG. 1, the mobile device 100 comprises an application processor (AP) 110, a CMOS image sensor 120, image processing device 130, an audio/video CODEC processing unit 140, and a storage unit 150.

The AP 110 may be variously embodied and in certain embodiments will be provided as a System on Chip (SoC). The AP 100 may be used to control the overall operation of the mobile device 100 and its constituent components.

The CMOS image sensor (CIS) 120 may be embodied as previously described. That is, light sensing devices of the constituent pixel array of the CMOS image sensor 120 may be used to capture incident light, generate a corresponding, analog electrical signal, and provide the analog electrical signal to the image processing device 130.

The audio/video CODEC processing unit 140 processes audio/video signals provided to the AP 110 and/or audio/video signals provided by an external device, such as a speaker, a display, etc.

The storage unit 150 may be used to store data variously derived and/or generated by the operation of the mobile device 100. The storage unit 150 may include, but is not limited to, a non-volatile memory and/or a volatile memory capable of storing various types of data, such as (e.g.,) firmware used to drive the operation of the mobile device 100, user-generated data, etc.

Referring to FIG. 1, the mobile device 100 may be understood as including a set of functional blocks rather than physically discrete components. Thus, the AP 110, image processing device 130, ad/or audio/video codec processing unit 140 may merely be different functional products of different configurations of hardware, software and/or firmware. For example, the AP 110 may include various types of intellectual properties (IPs), and thus some of functions of the image processing device 130 and audio/video codec processing unit 140 may be performed by the IPs provided by the AP 110. Alternatively, the image processing device 130 and/or audio/video codec processing unit 140 may be fully integrated in a functional context with the AP 110.

In certain embodiments of the inventive concept, a constituent image processing device, like image processing device 130 of FIG. 1, will include two or more ISPs capable of independent operation with respect to the simultaneous processing of multiple image streams, wherein the multiple image streams may have respectively different resolutions. For example, recognizing that more than two ISPs may be operatively incorporated in an image processing device according to the inventive concept, the following description assumes for the sake of brevity and clarity that the image processing device 130 of FIG. 1 includes a first ISP and a second ISP, wherein the first ISP is used to process a first image stream having relatively low resolution (hereafter, "low-resolution"), and the second ISP is used to process a second image stream having relatively high resolution (hereafter, "high-resolution").

Accordingly, the first ISP may include a buffer (e.g., a line buffer) having a relatively small capacity and since the first ISP does not require a relatively complicated signal processing algorithm. That is, a shorter (or smaller) kernel size for the first signal processing algorithm may be used. Further, since the second ISP does not have to simultaneously process both first and second image streams having different respective resolution, its operating speed may be decreased. As a result, certain embodiments of the inventive concept may also reduce the current consumed during the operation of the image processing device 130 may be reduced. Still further, overall image processing control over the simultaneously processed images streams may be obtained.

Figure 2:
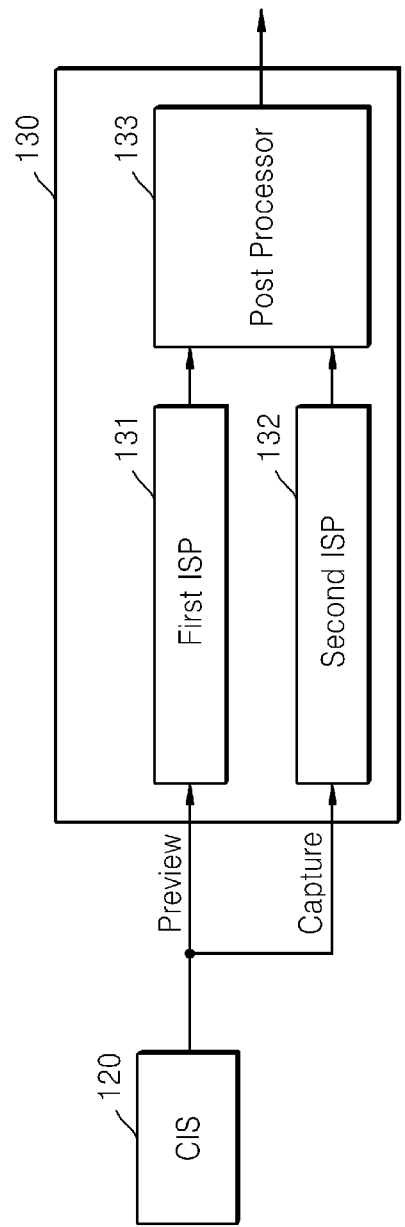
FIG. 2 is a block diagram further illustrating the image processing device of FIG. 1 according to an embodiment of the inventive concept.

The composition and operation of the image processing device 130 shown in FIG. 1 will be further described in the context of the illustrated embodiments that follow. FIG. 2 is a block diagram further illustrating in one embodiment the image processing device 130 of FIG. 1. Referring to FIG. 2, a CMOS image sensor (CIS) 120 is again assumed as an image sensor. However, other types of image sensors might be substituted in other embodiments of the invention concept.

The image processing device 130 of FIG. 2 includes; a first ISP 131 provided to process a low-resolution image stream, a second ISP 132 provided to process a high-resolution stream, and a post processor 133.

Thus, the image processing device 130 of FIG. 2 may simultaneously process one image for output to a display (not shown) and another image for storage in the storage unit 150 or some other associated memory. In this context, as the image sensor 120 captures a sequence of images, the images may be output it as a "preview" to a display. Then, when a "capture command" is received (e.g., in response to a user input) one of the sequence of images (hereafter, the "final image") captured by the image sensor 120 will be stored in the storage unit 150. This functional example is drawn to an assumption that the mobile device 100 of FIG. 1 includes (e.g.,) a camera apparatus providing a sequence of images for display that are processed with relatively low-resolution, whereas the final image selected by the capture command is stored in memory and has a relatively high-resolution.

Thus, assuming that a low-resolution camera (e.g., a front camera) and a high-resolution camera (e.g., a rear camera) are mounted on a mobile device, the illustrated embodiment of FIG. 2 provides the image processing device 130 capable of simultaneously processing image streams provided by both cameras. For example, the first ISP 131 may receive and process relatively low-resolution images from a front camera, and the second ISP 132 may receive and process relatively high-resolution images from a rear camera.

The images captured by the CIS 120 may be provided at a predetermined frame rate (e.g., frames per second) to the first ISP 131. Continuing with the working example, images having relatively low-resolution for the preview (hereinafter, "preview images") are passed to the first ISP 131 and processed as preview images that may be (optionally) subsequently processed by the post processor 133.

However, when the predetermined command is received, the image sensor 120 provides a relatively high-resolution image. For example, while the mobile device 100 operates, the mobile device 100 may receive a capture command with respect to an image identified by a user, and in response the image sensor 120 may output a high-resolution final image. The second ISP 132 may be used to process the final image and provide the processing result to the post processor 133.

Where provided, the post processor 133 may be used to perform various operations further processing a digital image signal. For example, operations not performed by the first and second ISPs 131 and 132 may be performed by the post processor 133, such as operations that apply post-processing algorithms intended to improve contrast or resolution, remove noise, etc. The output of the post processor 133 may be passed to the audio/video CODEC processing unit 140 for further processing before being exported to a display and/or a memory like storage unit 150.

In the image processing device 130 shown in FIG. 2, a low-resolution preview image is processed by the first ISP 131, and only when a final image is designated by a corresponding command will the second ISP 132 operate. Since image resolution that is supported by the first ISP 131 for processing the preview image is low, the corresponding size of the line buffer may be relatively small. And by reducing the kernel size used to process the low-resolution image and/or by simplifying the processing algorithm, the overall size of a corresponding logic circuit may be decreased. Further, the operating speed of the first ISP 131 may be decreased.

In contrast, since the second ISP 132 processes a high-resolution image, it is difficult to reduce the size of its line buffer. However, since a final image is processed in the background while the first ISP 131 processes preview image (s), the operating speed of the second ISP 132 may also be decreased as compared with conventional configurations wherein a single ISP is used to simultaneously process multiple image streams having different resolutions.

According to the embodiment, an ISP that processes a low-resolution image and has a relatively small processing capacity and a slow processing speed, and another ISP that processes a high-resolution image and has a relatively large processing capacity and a fast processing speed are disposed in parallel, so that power consumption may be decreased, and since time-division processing is not performed on images having different resolution, easiness of an image processing control may be improved.

Figure 3:
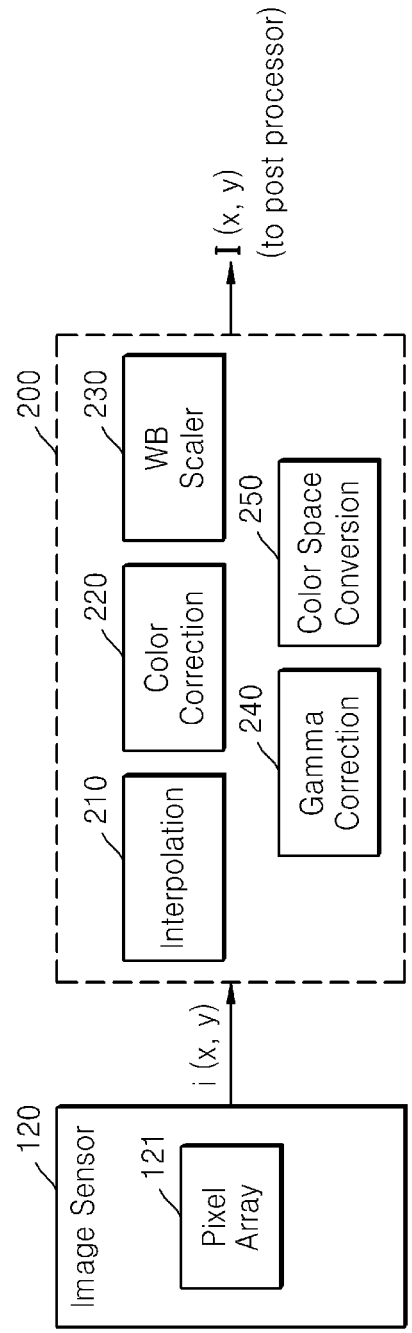
FIG. 3 is a block diagram further illustrating the image signal processor (ISP) of FIG. 2 according to an embodiment of the inventive concept.

FIG. 3 is a block diagram illustrating in one example an ISP 200 that may be used as either the first ISP 131 or the second ISP 132 of FIG. 2 in certain embodiments of the inventive concept. Here again, an image sensor 120 (e.g., a CMOS image sensor) having a pixel array 121 is assumed to generate an image signal i(x,y) provided to the ISP 200.

The ISP 200 may include various functional blocks for image processing. For example, the ISP 200 may include an interpolation unit 210 performing interpolation on the image signal i(x,y) provided by the output from the pixel array 121; a color correction unit 220 correcting a signal output from the interpolation unit 210 relative to a standard image signal; a white balance (WB) scaler 230 expressing a white portion of an image by adjusting a ratio of a color component in the image signal provided from the color correction unit 220; a gamma correction unit 240 performing gamma correction on a white-balance adjusted image signal; and a color space conversion unit 250 converting a processed color space so as to match the processed color space with a color space of an output device. A processed signal I(x,y) output from the color space conversion unit 250 may be provided to the post processor 133 of FIG. 2.

Of further note, the image sensor 120 may output images having different resolutions. For example, the image sensor 120 may output images having different resolution due to an operation wherein a binning mode varies according to a predetermined set value. In FIG. 3, the image sensor 120 may provide a low-resolution preview image that is an image continuously output to a display. However, when a final image is designated by a user-initiated command, the image sensor 120 may provide a high-resolution final image. Assuming that the ISP 200 corresponds to the first ISP 131 of FIG. 2, the image signal i(x,y) corresponds to relatively low-resolution image(s), and assuming that the ISP 200 corresponds to the second ISP 132 of FIG. 2, the image signal i(x,y) correspond to relatively high-resolution image (s).

Figure 4:
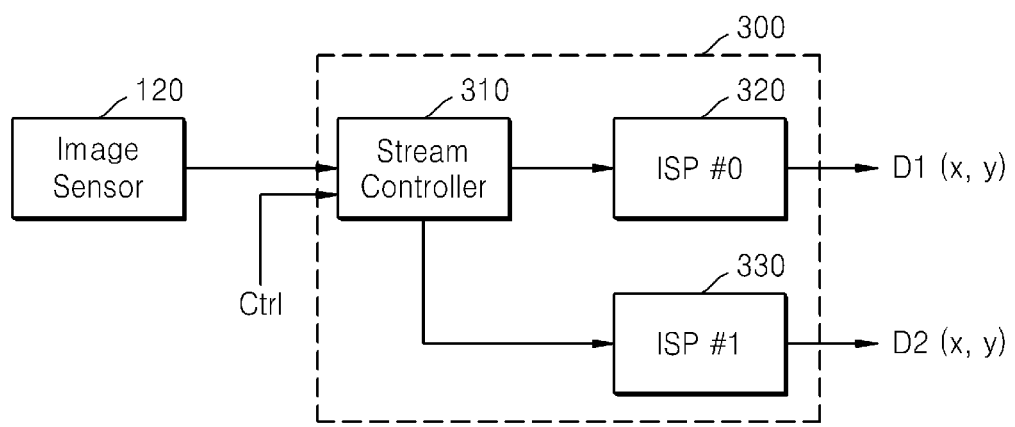
FIG. 4 is a block diagram further illustrating the image processing device of FIG. 1 according to another embodiment of the inventive concept.

FIG. 4 is a block diagram illustrating in another example an image processing device 300 that may be used as the image processing device 130 of FIG. 1 according to an embodiment of the inventive concept. Referring to FIG. 4, the image sensor 120 that generates an image in cooperation with the image processing device 300 is also illustrated.

As illustrated in FIG. 4, the image processing device 300 include a stream controller 310, a first ISP 320, and a second ISP 330. As described above, an image processing device or an ISP may be variously embodied, and in the embodiment of FIG. 4, the image processing device 300 includes the stream controller 310, but the stream controller 310 may be disposed outside the image processing device 300 and may control an image stream. For example, certain elements of the image processing device 300 shown in FIG. 4 may be functionally provided by the AP 110 of FIG. 1.

The stream controller 310 receives an image stream from the image sensor 120, and performs a control operation on the image stream. Thus, the stream controller 310 may receive a first image stream having first resolution from the image sensor 120, and also receive a second image stream having second resolution different from (e.g., better than) the first resolution.

In this context, the stream controller 310 may selectively output the image from the image sensor 120 to the first ISP 320 or the second ISP 330 in response to an applied control signal Ctrl. In the illustrated embodiment of FIG. 4, when a preview image is displayed, the stream controller 310 may control the first image stream having first resolution to be continuously provided to the first ISP 320. Then, when it is required to store a high-resolution, final image in response to a capture command initiated by a user, the stream controller 310 may output the second image stream having second resolution to the second ISP 330 in response to the control signal Ctrl. Hence, the first ISP 320 receives and processes a low-resolution image stream to output a digitized first image signal D1(x,y), while the second ISP 330 receives and processes a high-resolution image stream to output a digitized second image signal D2(x,y).

The control signal Ctrl may be used to activated/deactivate the various processing modes. In certain embodiments of the inventive concept, the control signal Ctrl may will be generated by a specific functional block in the mobile device 100. For example, the AP 110 may be used to detect a capture command, and in response, generate an appropriate control signal Ctrl. When a continuous image-capturing command is received, the AP 110 may periodically activate the control signal Ctrl so that images are processed with a predetermined frame rate using the second ISP 330 in response to the continuous image-capturing command.

Figure 5:
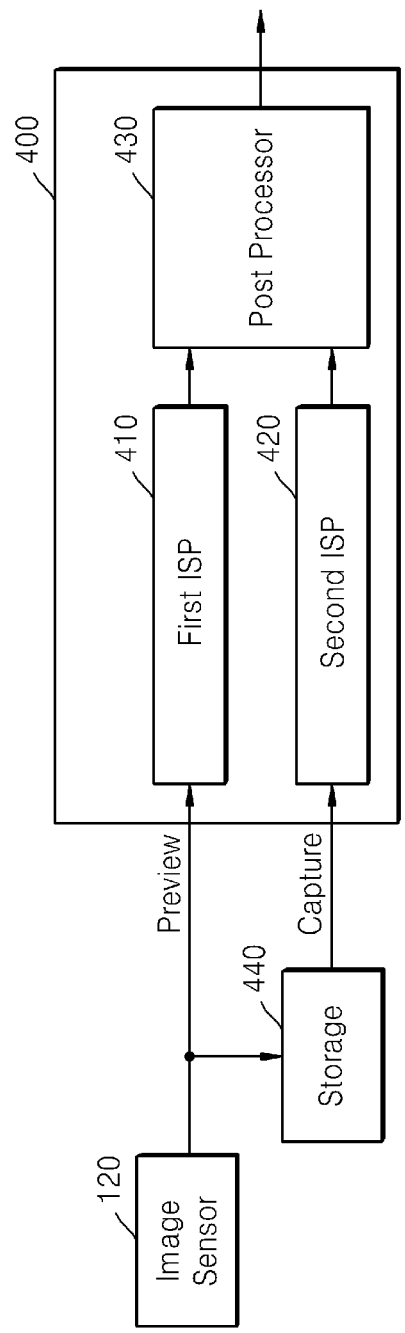
FIGS. 5, 6 and 7 are block diagrams respectively illustrating the image processing device of FIG. 1 according to various embodiments of the inventive concept.

FIG. 5 is a block diagram illustrating in another example an image processing device 400 that may be used as the image processing device 130 of FIG. 1 according to certain embodiments of the inventive concept. Referring to FIG. 5, the image sensor 120 is again assumed to generate an image in cooperation with the image processing device 400.

As illustrated in FIG. 5, the image processing device 400 includes a first ISP 410, a second ISP 420, and a post processor 430. However, the image processing device 400 is also connected to a storage unit 440. In the embodiment of FIG. 5, the storage unit 440 is disposed external to the image processing device 400, but may alternately be disposed internal to the image processing device 400. For example, the image processing device 400 and the storage unit 440 may be connected to the AP 110 via a system bus, and in response to a control by the AP 110, an image stored in the storage unit 440 may be provided or may not be provided to the image processing device 400. That is, a memory may be disposed internal to, or external from the AP 110 and firmware may be stored in the memory. And under the control of the firmware, an image may be stored in the storage unit 440.

The first ISP 410 and the second ISP 420 may be used to process images having different resolutions. For example, the first ISP 410 may be used to process a relatively low-resolution image, while the second ISP 420 processes a relatively high-resolution image. And as before, the image sensor 120 may provide both low-resolution image(s) for preview and a high-resolution final image.

The preview images are continuously provided to the first ISP 410, and the first ISP 410 processes and provides the preview images to the post processor 430. On the other hand, the final image is provided to the storage unit 440 and temporarily stored in the storage unit 440. Thereafter, the final image temporarily stored in the storage unit 440 may be provided to and processed by the second ISP 420.

For example, when a high-speed continuous image-capturing mode is set, a plurality of captured images are sequentially generated. In the illustrated embodiment of FIG. 5, the storage unit 440 may be used to store one or more final images, and then the one or more final images stored in the storage unit 440 may be provided to the second ISP 420 over a predetermined period. The timing of the provision of the final images to the second ISP 420 may be adjusted according to the capacity of the storage unit 440 acting as a final image buffer. Here again, this feature allows the operating speed of the second ISP 420 to be reduced accordingly.

Figure 6:
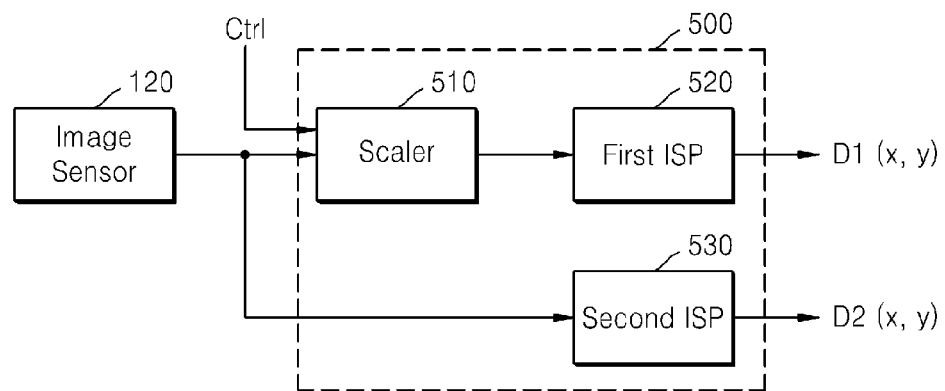

FIG. 6 is a block diagram of an image processing device 500 that is another example of the image processing device 130 of FIG. 1 according to other embodiments of the inventive concept. Referring to FIG. 6, the image sensor 120 generates an image in cooperation with the image processing device 500, and a scaler 510 is operatively disposed internal to the image processing device 500. However, the scaler 510 may be externally disposed from the image processing device 500 in other embodiments.

As illustrated in FIG. 6, the image processing device 500 includes the scaler 510, a first ISP 520, and a second ISP 530. Although not illustrated in FIG. 6, the post processor 133 in the previous embodiment may be further arranged in the image processing device 500. The first ISP 520 and the second ISP 530 may process images having different resolution. For example, the first ISP 520 may process a relatively low-resolution image and thus may output a digitized first image signal D1($x,y$), and the second ISP 530 may process a relatively high-resolution image and thus may output a digitized second image signal D2($x,y$).

The image sensor 120 may be variously embodied, for example, the image sensor 120 may be embodied so as to output only a high-resolution image. An image signal from the image sensor 120 may be output, as a preview image, to a display via an image processing operation, or may be stored as a captured image in a storage unit (not shown). The scaler 510 may receive the high-resolution image from the image sensor 120, may process the high-resolution image, and thus may generate a low-resolution image. The low-resolution image generated by the scaler 510 is provided to the first ISP 520.

The scaler 510 may perform a scaling operation in response to a control signal Ctrl. In certain embodiments of the inventive concept, the generation of the control signal Ctrl may be controlled by firmware executed in the image processing device 500. In order to output a preview image, the scaler 510 may continuously perform a scaling operation on an image signal from the image sensor 120.

In order to store a high-resolution captured image, the second ISP 530 processes the image signal from the image sensor 120. The second ISP 530 selectively operates in response to a capture command or the like, so that the high-resolution final image may be generated.

Figure 7:
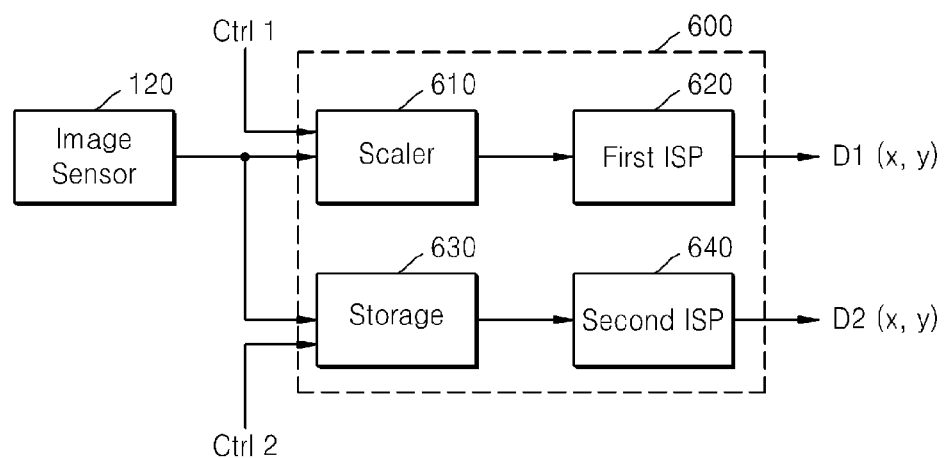

FIG. 7 is a block diagram of an image processing device 600 that is another possible example of the image processing device 130 of FIG. 1 according to certain embodiments of the inventive concept. Referring to FIG. 7, a scaler 610 and a storage unit 630 are disposed internal to the image processing device 600, but might alternately be disposed external from the image processing device 600.

As illustrated in FIG. 7, the image processing device 600 includes the scaler 610, the storage unit 630, a first ISP 620, and a second ISP 640. Although not illustrated in FIG. 7, the post processor 133 of FIG. 2 may also be disposed in the image processing device 600. As before, the first ISP 620 and the second ISP 630 may be used to process images having different resolutions. For example, the first ISP 620 may process a relatively low-resolution image and the second ISP 530 may process a relatively high-resolution image. In the embodiment of FIG. 7, the scaler 610 and the storage unit 630 may operate in a similar or same manner as configuration and operations described in the previous embodiment.

Under the control of firmware, for example, the first and second control signals Ctrl1 and Ctrl2 may be generated such that the scaler 610 operates in response to the first control signal Ctrl1 and the storage unit 630 operates in response to the second control signal Ctrl2.

The image sensor 120 may be embodied so as to output only a high-resolution image. The scaler 610 may receive the high-resolution image from the image sensor 120, may process the high-resolution image, and thus may generate and provide a low-resolution image to the first ISP 620. The first ISP 620 may process the low-resolution image generated by the scaler 610, and thus may generate a digitized first image signal D1($x,y$).

The high-resolution image from the image sensor 120 is provided to the storage unit 630. In response to an input of a capture command or the like, one or more final images are stored in the storage unit 630, and the final images stored in the storage unit 630 are provided to the second ISP 640 over a predetermined period. The second ISP 640 may process the high-resolution image from the storage unit 630 and thus may generate a digitized second image signal D2($x,y$). The timing of the provision of the final images to the second ISP 640 may be adjusted using the storage unit 630 as a buffer so that the operating speed of the second ISP 640 may be reduced.

Figure 8:
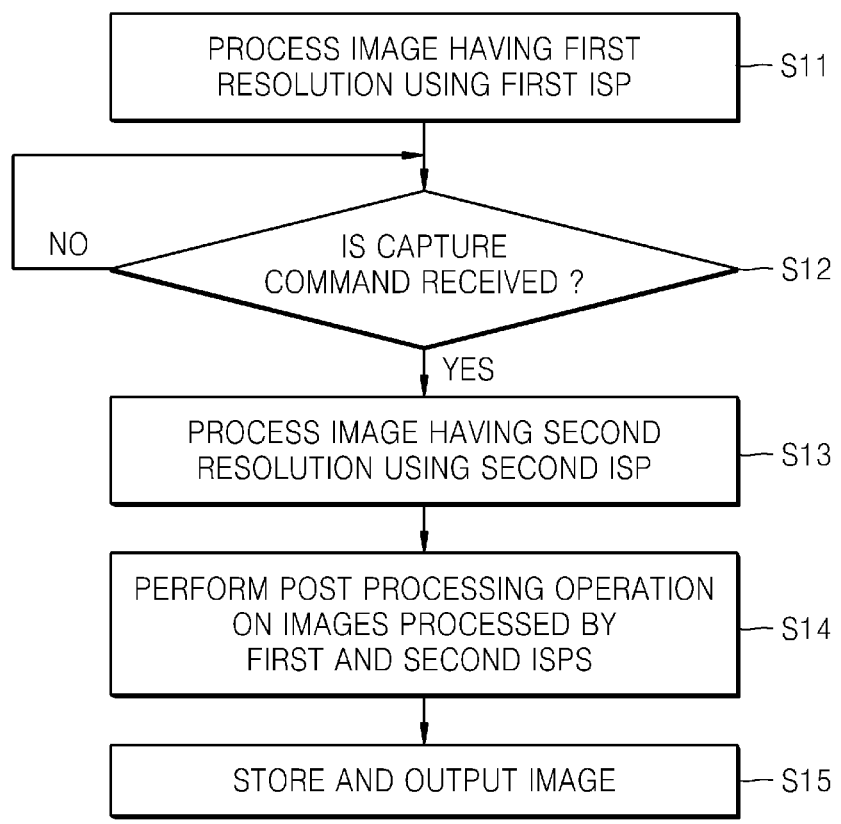
FIGS. 8 and 9 are flowcharts summarizing methods of operating an image processing device according to various embodiments of the inventive concept.

FIG. 8 is a flowchart summarizing an operating method for an image processing device according to embodiments of the inventive concept. The image processing device is assumed to include both first and second ISPs as described in the foregoing embodiments. That is, a first ISP is used to process a relatively low-resolution image and a second ISP is used to process a relatively high-resolution image.

As illustrated in FIG. 8, an image having first resolution is processed by the first ISP (S11). The first resolution may be relatively low resolution, and in order to output a preview image, the image having first resolution may be continuously processed by the first ISP.

Afterward, the image processing device may detect whether a specific command for an image processing operation is received. For example, a high-resolution image may be processed and stored, in response to a capture command, thus, the image processing device may detect whether the capture command is received (S12).

When the capture command is not received, the preview image may be continuously output. When the capture command is received, an image having second resolution that is relatively high-resolution may be processed by the second ISP (S13). The images processed by the first and second ISPs are provided to a post processor, so that a post processing operation(s) may be performed (S14). Then, the image having first resolution is output to a display, and the image having second resolution is stored in a storage unit or memory (S15).

Figure 9:
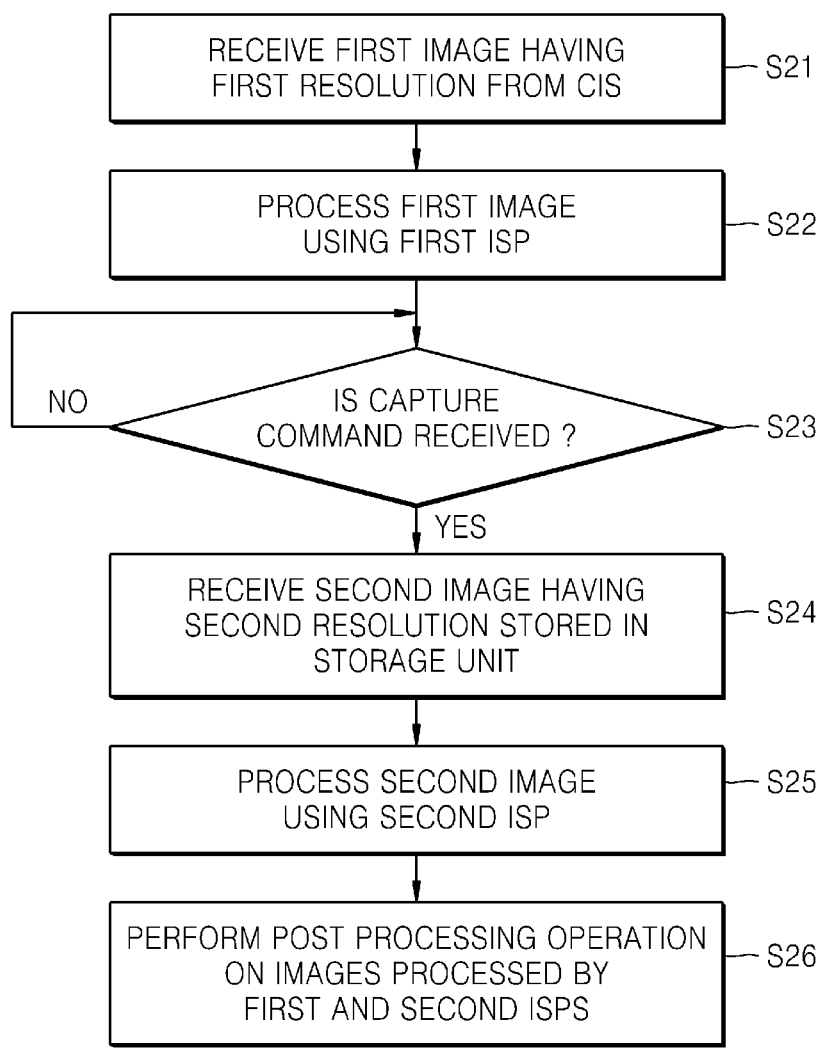

FIG. 9 is a flowchart summarizing an operating method for an image processing device according to still other embodiments of the inventive concept. The method of FIG. 9 assumes an image processing device including a storage unit capable of buffering a stream of high-resolution images.

As illustrated in FIG. 9, when an image having first resolution (hereinafter, the first image) is received from an image sensor (e.g., a CMOS image sensor, CIS) (S21), the first image may be processed by the first ISP that is included in the image processing device (S22). The first resolution may be relatively low resolution, and in order to output a preview image, the image having first resolution may be continuously processed by the first ISP.

Afterward, the image processing device may determine whether a capture command is received (S23), and when the capture command is not received, the preview image is continuously output. When the capture command is received, a second image having second resolution that is relatively high-resolution may be received from the CMOS image sensor, and the second image having second resolution from the CMOS image sensor may be stored in the storage unit. The second image having second resolution stored in the storage unit is received (S24), the second ISP processes the second image having second resolution (S25). Also, the first and second images that were processed by the first and second ISPs are post-processed so as to be output to the display, to be stored as a captured image, or the like (S26).

Figure 10:
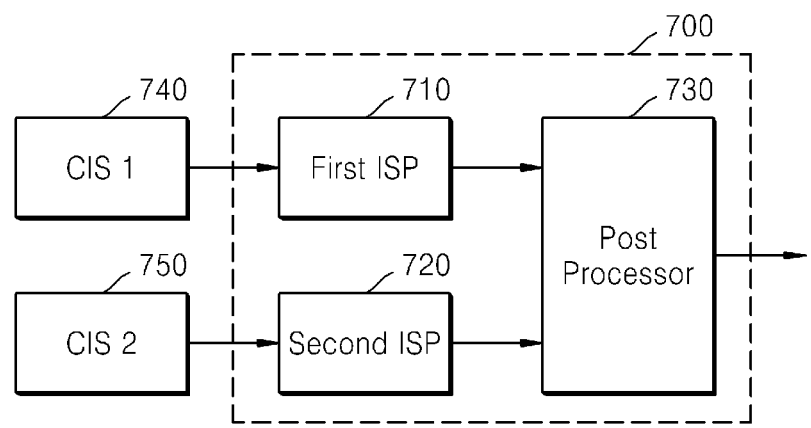
FIG. 10 is a block diagram further illustrating the image processing device of FIG. 1 according to another embodiment of the inventive concept.

FIG. 10 is a block diagram of an image processing device 700 that may be used as the image processing device 130 of FIG. 1 according to certain embodiments of the inventive concept. Referring to FIG. 10, first and second image sensors 740 and 750 are capable of independently generating image(s) in cooperation with the image processing device 700. Similar to the previous embodiments, the image processing device 700 includes a first ISP 710 that processes a relatively low-resolution image, a second ISP 720 that processes a relatively high-resolution image, and a post processor 730 that performs a post processing.

As illustrated in FIG. 10, the image processing device 700 receives image signals from the first and second image sensors 740 and 750. The first and second image sensors 740 and 750 may output the image signals having different resolutions. For example, the first image sensor 740 may output a first image signal having relatively low-resolution, and the second image sensor 750 may output a second image signal having relatively high-resolution.

The first ISP 710 receives the first image signal from the first image sensor 740, and performs a low-resolution signal processing operation on the first image signal. An image that is output from the first ISP 710 is provided to the post processor 730. The second ISP 720 receives the second image signal from the second image sensor 750 and performs a high-resolution signal processing operation on the second image signal. An image that is output from the second ISP 720 is provided to the post processor 730. The image output from the first ISP 710 may pass through the post processor 730 and then may be output, as a preview image, to a display. Also, the second ISP 720 may selectively operate in response to a capture command or the like, and the image output from the second ISP 720 may pass through the post processor 730 and then may be stored as a high-resolution image.

Figure 11:
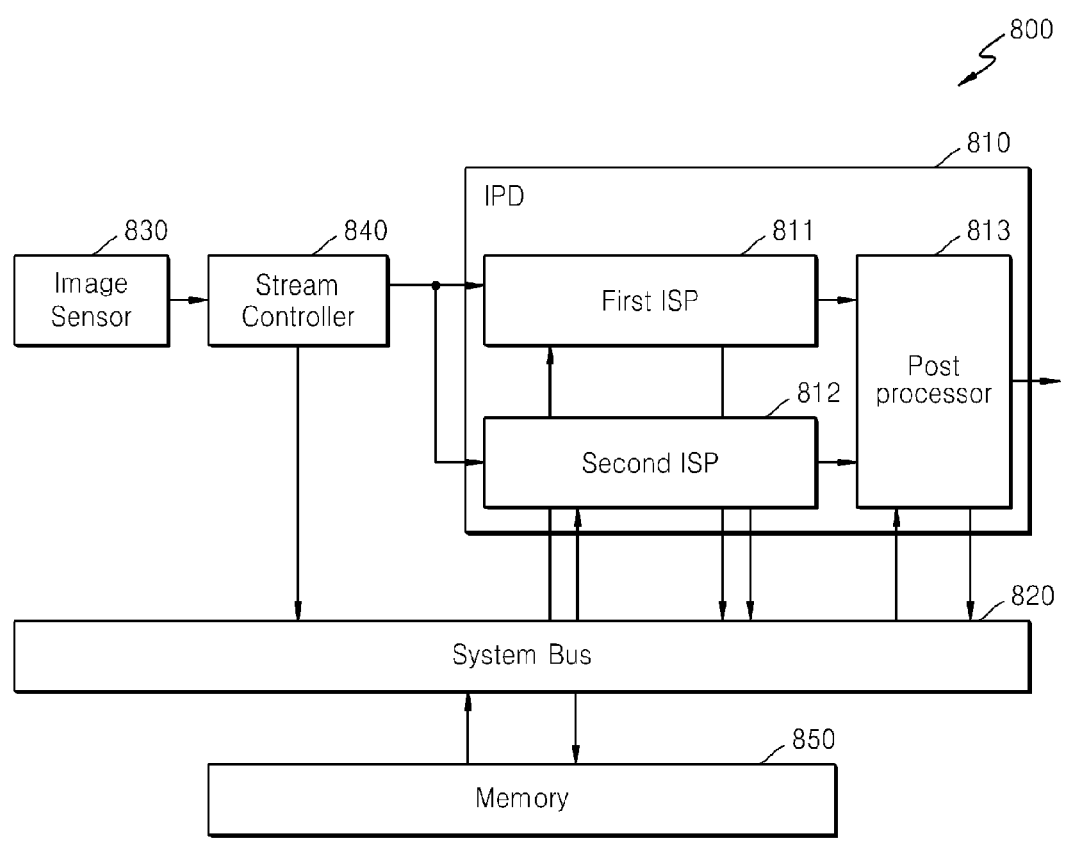
FIGS. 11 and 12 are block diagrams of an image processing system according to various embodiments of the inventive concept.

FIG. 11 is a block diagram of an image processing system 800 according to certain embodiments of the inventive concept. As illustrated in FIG. 11, the image processing system 800 includes an image processing device 810 consistent with one of the previous embodiments. The image processing system 800 includes the image processing device 810, a system bus 820, an image sensor 830, a stream controller 840, and a memory 850. As in the previous embodiments, the image processing device 810 includes a first ISP 811 that processes a relatively low-resolution image, a second ISP 812 that processes a relatively high-resolution image, and a post processor 813 that performs a post processing. Also, as described above, the image processing device 810 may be variously embodied, for example, the stream controller 840 may be included in the image processing device 810. Also, the stream controller 840 may include a scaler (not shown) in the previous embodiments.

Also, when the image processing device 810 is assumed to be included in the AP 110, functional blocks such as those described in relation to FIG. 9 may be provided by the AP 110. For example, the AP 110 may include the image processing device 810, the stream controller 840, and a memory interface (not shown), and may communicate with the memory 850 via the system bus 820 and thus may store information in the memory 850 or may read information from the memory 850.

The image sensor 830 provides an image with a predetermined pattern (e.g., a Bayer pattern) to the stream controller 840. The stream controller 840 may deliver the image to the image processing device 810 and to the memory 850 via the system bus 820. When the image sensor 830 outputs only a high-resolution image, the stream controller 840 may down-scale the high-resolution image and then may provide a down-scaled low-resolution image to the image processing device 810. The down-scaled low-resolution image may be processed by at least one of the first and second ISPs 811 and 812.

In the illustrated present embodiment of FIG. 11, when the image sensor 830 outputs high-resolution and low-resolution images, the stream controller 840 may control the low-resolution image to be provided to the first ISP 811 and may control the high-resolution image to be provided to the second ISP 812. Alternatively, as an example of a different image delivery path, the high-resolution image may be stored in the memory 850 via the system bus 820, and then the high-resolution image that is stored in the memory 850 may be provided to the second ISP 812 via the system bus 820. Accordingly, as in the previous embodiments, the memory 850 may operate as a buffer, so that an operating speed of the second ISP 812 may be decreased.

Alternatively, when the image sensor 830 outputs only a high-resolution image, the low-resolution image down-scaled by the scaler in the stream controller 840 may be provided to the first ISP 811, and the high-resolution image from the image sensor 830 may be provided to the second ISP 812. Alternatively, as an example of a different image delivery path, the high-resolution image may be stored in the memory 850 via the system bus 820, and then the high-resolution image that is stored in the memory 850 may be provided to the second ISP 812 via the system bus 820.

Figure 12:
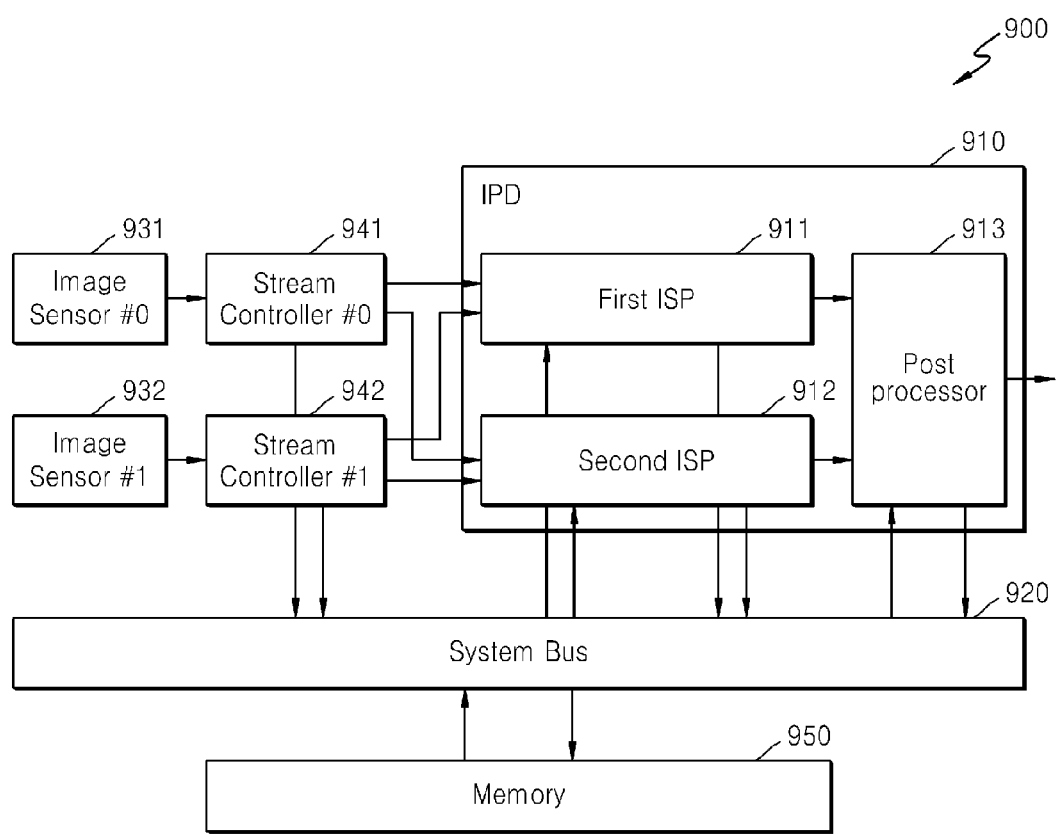

FIG. 12 is a block diagram of an image processing system 900 according to still other embodiments of the inventive concept. As illustrated in FIG. 12, the image processing system 900 includes an image processing device 910 consistent with one of the previous embodiments. The image processing system 900 includes a system bus 920, first and second image sensors 931 and 932, first and second stream controllers 941 and 942, and a memory 950. Also, the image processing device 910 may include a first ISP 911 that processes a relatively low-resolution image, a second ISP 912 that processes a relatively high-resolution image, and a post processor 913 that performs a post processing.

The first image sensor 931 and the second image sensor 932 output images having different resolutions. For example, each of the first image sensor 931 and the second image sensor 932 may output both low-resolution and high-resolution images. The first stream controller 941 may control a delivery of a first image from the first image sensor 931, and the second stream controller 942 may control a delivery of a second image from the second image sensor 932.

When each of the first and second stream controllers 941 and 942 receives the low-resolution image, each of the first and second stream controllers 941 and 942 may provide the low-resolution image to the first ISP 911, and when each of the first and second stream controllers 941 and 942 receives the high-resolution image, each of the first and second stream controllers 941 and 942 may provide the high-resolution image to the second ISP 912. Alternatively, as an example of a different image delivery path, each of the first and second stream controllers 941 and 942 may provide the high-resolution image to the memory 950 via the system bus 920, and then the high-resolution image that is stored in the memory 950 may be provided to the second ISP 912 via the system bus 920. When the first image sensor 931 and the second image sensor 932 output only a high-resolution image, each of the first and second stream controllers 941 and 942 may perform a down-scaling operation on the high-resolution image and then may provide a low-resolution image to the first ISP 911.

Figure 13:
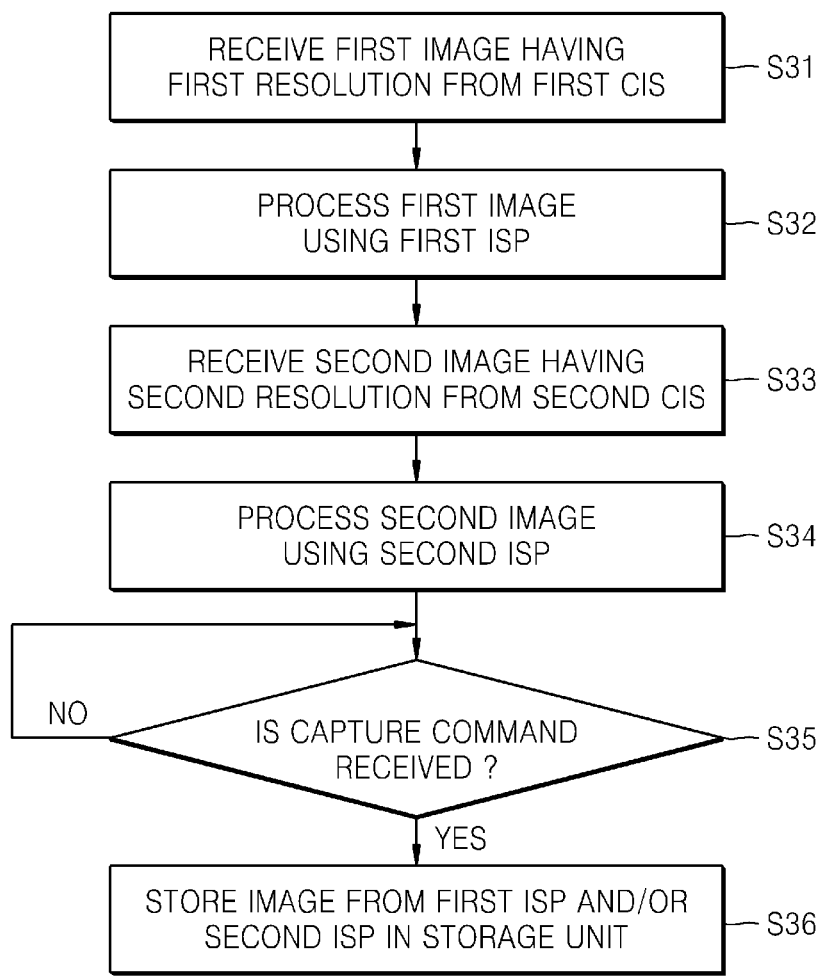
FIG. 13 is a flowchart summarizing a method of operating an image processing device according to another embodiment of the inventive concept.

FIG. 13 is a flowchart summarizing an operating method of an image processing device according to certain embodiments of the inventive concept. The method of FIG. 13 assumes the use of a device or system including a dual-camera system wherein a first camera mounted on one side (e.g., a front side) outputs a low-resolution image, and a second camera mounted on the other side (e.g., a rear side) outputs a high-resolution image.

According to the operating method of FIG. 13, a first image having first resolution may be received from a first CMOS image sensor (S31). A stream controller arranged in the device or system may control delivering the first image, and for example, when the first image is provided to a first ISP in the image processing device, and the first ISP performs a processing operation on the first image (S32). The processed first image may be output as a preview image to a display.

A second image having second resolution may be received from a second CMOS image sensor (S33). When the second image is provided to a second ISP in the image processing device, the second ISP may perform a processing operation on the second image (S34). The processing operations on the first image and the second image may be performed in parallel. In the present embodiment, all of the first and second images may be output to the display. In a case where all of the first and second images are output as preview images, if at least one of the first and second images is a high-resolution image, a down-scaling operation is performed on the high-resolution image, so that a low-resolution image may be output to the display.

Afterward, it is determined whether a capture command for storing the high-resolution image has been received (S35). For example, each of the first and second CMOS image sensors may output the high-resolution image. The second CMOS image sensor mounted at the rear side is assumed to output the high-resolution image. In this case, an image that was processed by the first ISP and/or the second ISP may be stored in a storage unit, and for example, when an image captured by using the rear side camera is stored, the high-resolution image from the second ISP may be stored in the storage unit.

Figure 14:
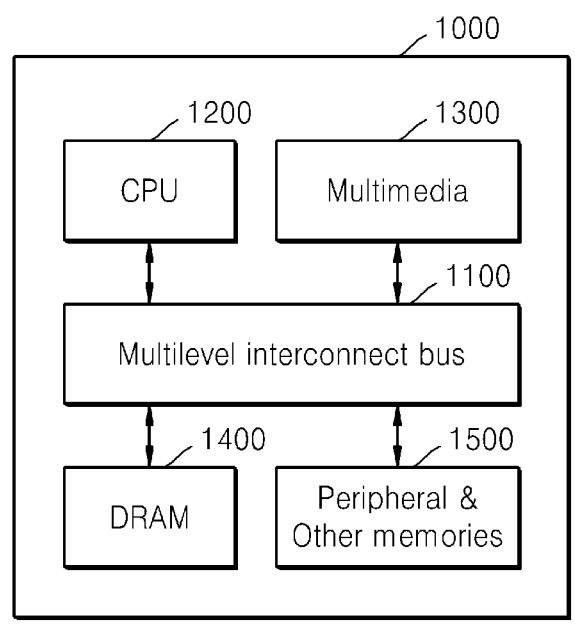
FIG. 14 is a block diagram of an application processor (AP) including an image processing device according to an embodiment of the inventive concept.

FIG. 14 is a block diagram of an AP 1000 including an image processing device, according to an embodiment of the inventive concept. The AP 1000 may be variously embodied (e.g., as a SoC). The SoC may be embodied in a manner that a system having various functions are integrated into one semiconductor chip, and a plurality of IPs may be integrated into the SoC. Each of the plurality of IPs may be implemented in the SoC and thus may perform its specific function.

The AP 1000 may include the plurality of IPs, e.g., may include, as illustrated in FIG. 14, a multilevel interconnect bus 1100 as a system bus, and a central processing unit (CPU) 1200, a multimedia unit 1300, a memory device 1400, and a peripheral circuit 1500 that are connected with the multilevel interconnect bus 1100.

The multilevel interconnect bus 1100 may be embodied as a bus to which a protocol having a predetermined standard bus specification is applied. For example, as the standard bus specification, the Advanced Microcontroller Bus Architecture (AMBA) protocol of the Advanced RISC Machine (ARM) Company may be applied.

Types of a bus using the AMBA protocol may include the Advanced High-Performance Bus (AHB), the Advanced Peripheral Bus (APB), the Advanced eXtensible Interface (AXI), the AXI4, or the AXI Coherency Extensions (ACE). The AXI among the types of the bus is an interface protocol between IPs and provides a multiple outstanding address function, or a data interleaving function. In addition, other protocol types such as the uNetwork of the SONICs Inc., the CoreConnect of the IBM, or the Open Core Protocol of the OCP-IP may be applied to the multilevel interconnect bus 1100. Each of the plurality of IPs shown in FIG. 14 may be embodied as a functional block that performs a unique operation. For example, the CPU 1200 may correspond to a master IP and control all operations of the AP 1000. Also, the multimedia unit 1300 may include a plurality of the image signal processors that perform an image processing operation as in the previous embodiments. For example, images having various respective resolutions may be provided to the AP 1000, and images having at least two different resolution may be simultaneously processed. Also, in order to process the images having at least two different resolution, the image signal processors may have different functions (e.g., different line buffers or different kernel sizes).

The memory device 1400 may be arranged so as to temporarily store various types of information related to the operations of the AP 1000, and may include a dynamic random access memory (DRAM), or the like. As in the previous embodiments, the memory device 1400 may be used so as to temporarily store a high-resolution image. Also, the peripheral circuit 1500 may include various interface means for an interface with an external device, and may include various peripheral devices for implementing functions of the AP 1000. For example, the peripheral circuit 1500 may include other memories as well as a DRAM, a unit for accessing an external storage device, or the like.

The AP 1000 may be mounted in various terminals such as a mobile device, or the like, and may operate as a main processor. The multimedia unit 1300 may process an image having predetermined resolution, may decode an encoded bitstream and thus generate an original image, or may encode the original image and thus provide the encoded original image as a bitstream.

Figure 15:
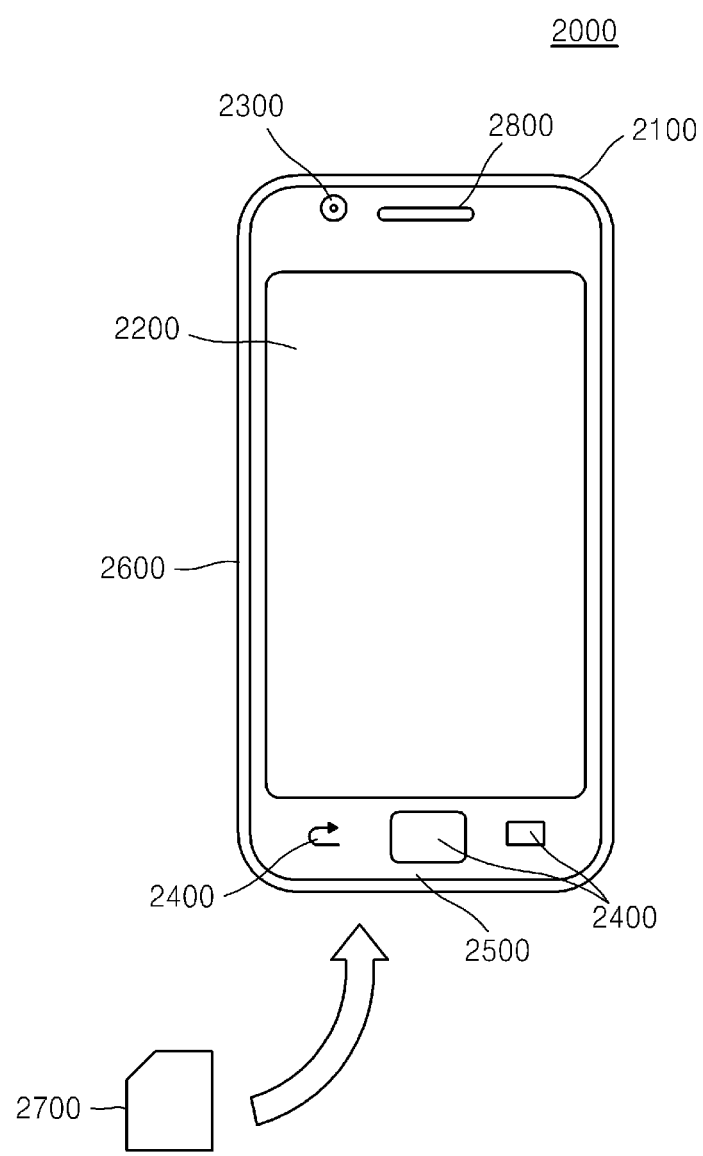
FIG. 15 illustrates a mobile terminal having an image processing device according to an embodiment of the inventive concept.

FIG. 15 illustrates a mobile terminal 2000 that may incorporate an image processing device according to an embodiment of the inventive concept. The AP 1000 of FIG. 14 may be mounted in the mobile terminal 2000 of FIG. 15. Accordingly, the AP 1000 may perform the signal processing operations on images that are captured by a camera 2300.

The mobile terminal 2000 may be a smart phone of which functions are not limited and most of the functions may be changed or extended via an application program. The mobile terminal 2000 includes an embedded antenna 2100 for exchanging a radio frequency (RF) signal with a wireless base station, and includes a display screen 2200 such as a liquid crystal display (LCD) screen, or an organic light emitting diode (OLED) screen for displaying images captured by a camera 2300 or images received and decoded by the antenna 2100. The mobile terminal 2000 may include an operation panel 2400 that includes a control button and a touch panel. When the display screen 2200 is a touch screen, the operation panel 2400 may further include a touch sensing panel of the display screen 2200. The mobile terminal 2000 may include a sound output unit in form of a speaker 2800 or another unit for outputting a voice and sound, and a sound input unit in form of a microphone 2500 or another unit for receiving an input of a voice and sound. The mobile terminal 2000 may further include the camera 2300 such as a charged coupled device (CCD) camera for capturing a video and a still image. The mobile terminal 2000 may be embodied while including a storage medium 2700 for storing encoded or decoded data such as a video or still images captured by the camera 2300, received via an e-mail, or obtained in another manner, and may include a slot 2600 for mounting the storage medium 2700 in the mobile terminal 2000. The storage medium 2700 may be a flash memory in other forms such as an SD card, an electrically erasable and programmable read only memory (EEPROM) embedded in a plastic case, or the like.

While the inventive concept has been particularly shown and described with reference to exemplary embodiments thereof, it will be understood that various changes in form and details may be made therein without departing from the scope of the following claims.

What is claimed is:

1. An image processing device comprising:
a first image signal processor (ISP) configured to process a first image having a first resolution;
a second ISP configured to process a second image having a second resolution different from the first resolution; and
a post processor configured to receive an image from at least one of the first and second ISPs and perform a post processing operation on the image, wherein
the first ISP processes the first image having the first resolution with a first line buffer and operates in accordance with a first kernel size, the second ISP processes the second image having the second resolution with a second line buffer and operates in accordance with a second kernel size, the second line buffer is larger than the first line buffer, and the second kernel size is larger than the first kernel size.

2. The image processing device of claim 1, wherein the first image processed by the first ISP is output as a preview image, and the second ISP selectively operates in response to a capture command.

3. The image processing device of claim 1, further comprising a stream controller configured to receive an image stream from an image sensor and output the received image stream to one of the first and second ISPs in response to a control signal.

4. The image processing device of claim 1, wherein:
the second image is provided from an image sensor to the second ISP, and
the image processing device further comprises a scaler configured to convert the second image to provide the first image to the first ISP.

5. The image processing device of claim 1, further comprising a storage unit configured to store the second image as received from an image sensor and provide the stored second image to the second ISP in response to a capture command.

6. The image processing device of claim 1, wherein the first ISP receives the first image from a first image sensor, and the second ISP receives the second image from a second image sensor.

7. The image processing device of claim 1, wherein:
an image from an image sensor is stored in a memory via a system bus, and
the second ISP receives the second image from the memory via the system bus in response to a capture command.

8. The image processing device of claim 1, further comprising:
a first stream controller configured to receive the first image from a first image sensor; and
a second stream controller configured to receive the second image from a second image sensor, wherein
the first ISP receives the first image from the first stream controller and processes the first image, and the first ISP receives the second image from the second stream controller and processes the second image.

9. An application processor comprising the image processing device of claim 1.

10. A mobile device comprising the image processing device of claim 1.

11. A method of processing an image, the method comprising:
processing a first image having first resolution using a first image signal processor (ISP);
determining whether a capture command is received;
upon determining that the capture command is received, processing a second image having second resolution higher than the first resolution using a second ISP; and
storing the second image in a memory, wherein
the first ISP processes the first image having the first resolution with a first line buffer and operates in accordance with a first kernel size, the second ISP processes the second image having the second resolution with a second line buffer and operates in accordance with a second kernel size, the second line buffer is larger than the first line buffer, and the second kernel size is larger than the first kernel size.

12. The method of claim 11, wherein the first image is generated by performing a down-scaling operation on the second image.

13. The method of claim 11, further comprising:
outputting both the first image and the second image to a display, wherein a low-resolution image generated by performing a down-scaling operation on the second image is output to the display; and
upon determining that the capture command is received, storing the second image in the memory.

14. The method of claim 11, wherein the second image is temporarily stored in the memory, and the second image temporarily stored in the memory is provided to the second ISP.

15. An application processor adapted for use in a mobile device and operating as a main processor for the mobile device, the application processor comprising:
a Central Processing Unit (CPU) configured to control operation of the application processor; and
a multimedia unit comprising a first image signal processor (ISP) having a first line buffer and operating in accordance with a first kernel size, and a second ISP having a second line buffer larger in size than the first line buffer and operating in accordance with a second kernel size larger than the first ISP kernel size, wherein:
the first ISP is configured to process a first image having a first resolution, and
the second ISP is configured to process a second image having a second resolution higher than the first resolution.

16. The application processor of claim 15, wherein the multimedia unit further comprises a bit stream decoder configured to decode an encoded bits stream to generate at least one of the first image and the second image.

17. The application processor of claim 15, wherein the CPU and multimedia unit are commonly configured on a System-on-Chip (SoC) together with a multilevel interconnect bus and a volatile memory.

18. The application processor of claim 15, wherein the first ISP receives the first image from a first image sensor, and the second ISP receives the second image from a second image sensor separate from the first image sensor.

19. The application processor of claim 18, wherein each one of the first image sensor and the second image sensor is a Complementary Metal-Oxide Semiconductor (CMOS) type image sensor.

* * * * *